Sept. 17, 1929.  W. S. RODENE  1,728,575
AEROPLANE
Filed Aug. 7, 1928  2 Sheets-Sheet 1
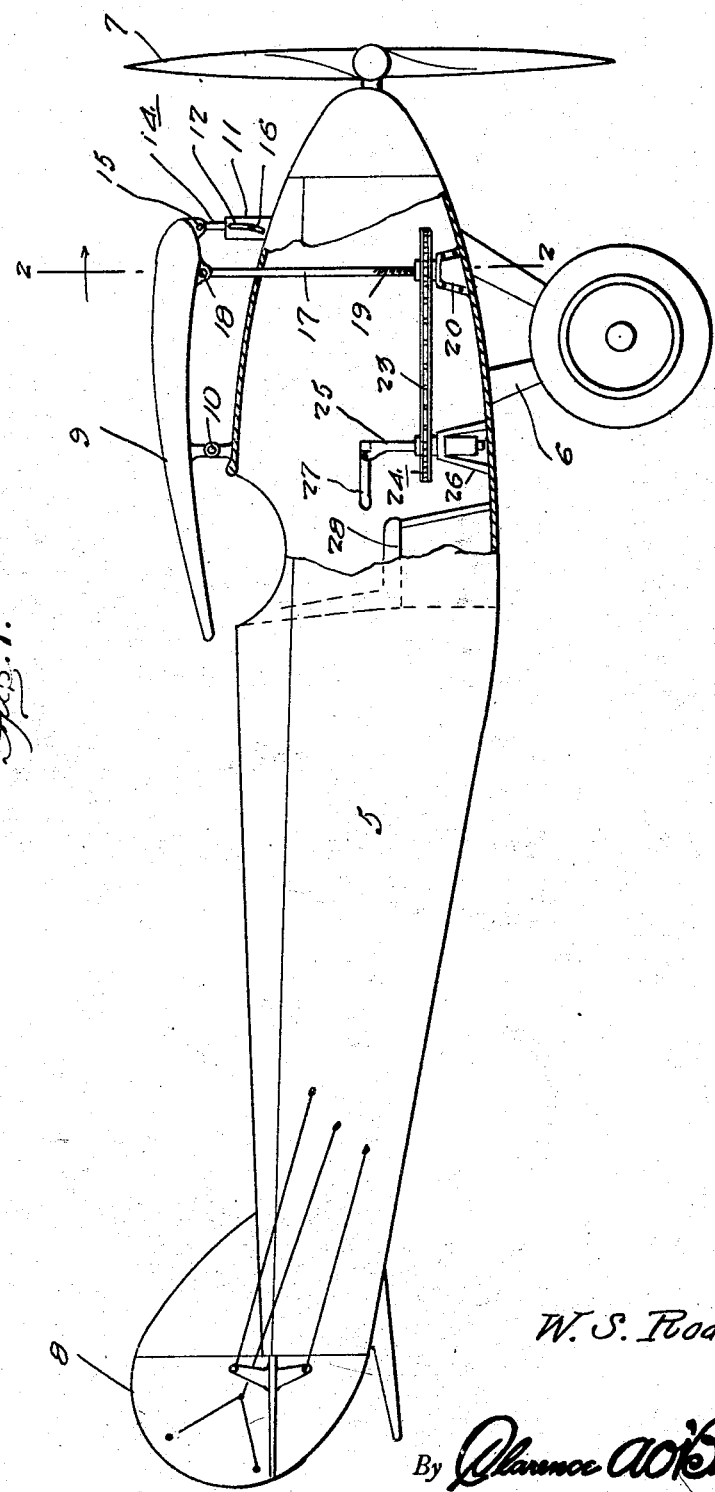
Inventor
W. S. Rodene
By Clarence A. O'Brien
Attorney Sept. 17, 1929.  W. S. RODENE  1,728,575
AEROPLANE
Filed Aug. 7, 1928  2 Sheets-Sheet 2
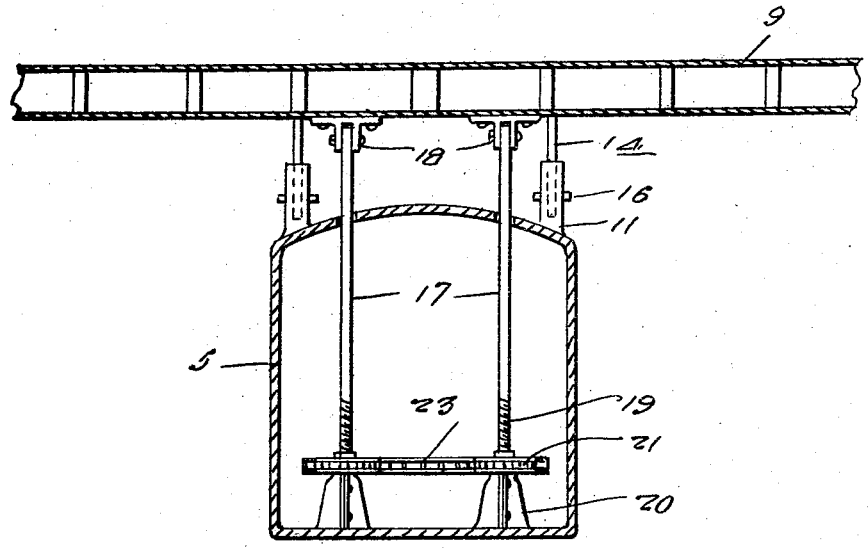
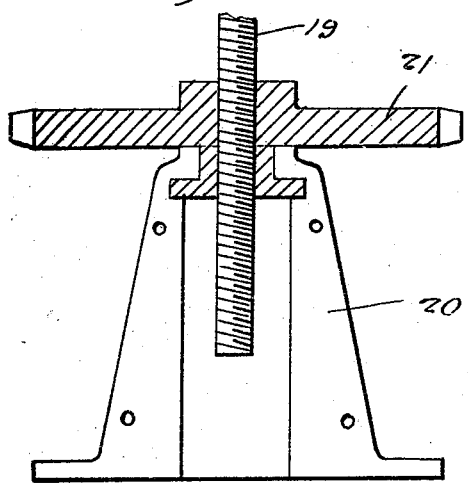
Inventor
W. S. Rodene
By Clarence A. O'Brien
Attorn Patented Sept. 17, 1929

1,728,575

UNITED STATES PATENT OFFICE

WALFORD S. RODENE, OF OSKALOOSA, IOWA

AEROPLANE

Application filed August 7, 1928. Serial No. 298,008.

The present invention relates generally to aeroplanes and more particularly to a wing structure which is pivotally mounted so that its angle of incidence may be changed and means for so changing said angle of incidence and thereby obtaining all of the advantages such as a quicker take off for the aeroplane, quicker ascent, a safe landing, the prevention of nose dives, and an all around better control of the aeroplane under operating conditions.

An important object of the invention resides in the provision of an improvement of this nature which is simple in its construction, inexpensive to install, compact and convenient, thoroughly efficient and reliable in use, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a sectional side elevation of an aeroplane embodying the features of my invention, Figure 2 is an enlarged detail sectional view taken substantially on the line 2—2 of Figure 1, Figure 3 is an enlarged detail section through one of the sprockets which cause the swinging of the wing.

Referring to the drawings in detail it will be seen that the numeral 5 denotes an aeroplane fuselage which may be of the conventional or any preferred type.

In the present instance this fuselage is mounted on landing gear 6, has a driving propeller 7 and is provided with the usual rear controls 8. A wing structure 9 is pivotally mounted on top of the fuselage as at 10. Hollow members 11 rise from the fuselage forwardly of the pintle connections 10 and have arcuate slots 12 at the sides thereof.

Links 14 are pivotally connected as at 15 with the forward edge of the wings and extend down into the hollow members 11 and have lateral pins 16 projecting through the slots 12 thereby limiting the swinging movement of the wing structure.

Bars 17 are pivotally mounted as at 18 on the wing structure 9 to depend downwardly therefrom and the lower ends of these bars are threaded as is indicated at 19. Brackets 20 rise from the bottom of the fuselage and have journaled in their upper ends sprockets 21 which threadedly receive the threaded ends 19 of the bars 17.

A chain 23 is trained over these sprockets 21 and over a sprocket 24 on a shaft 25 journaled in the bracket 26 in the cockpit of the fuselage 5.

This shaft 25 is controlled by a crank or lever 27 from the seat 28 by the aviator. Obviously by swinging the control member 27 the shaft 25 may be rocked to cause the chain 23 to turn the sprocket 21 thereby lifting or lowering the bars 17 to adjust the angle of incidence of the wing structure as may be desired.

It is thought that the construction, operation, utility and advantages of this invention will now be quite apparent to those skilled in this art without a more detailed description thereof.

The present embodiment of the invention has been disclosed in detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. An aeroplane of the class described including a fuselage, a wing structure across the fuselage, means for pivotally mounting the wing structure on the fuselage, a pair of hollow members rising from the fuselage having slotted sides, links pivotally engaged with the forward edge of the wing and extending into the hollow members and having lateral pins projecting through the slots to limit the swinging movement of the wing, and means for rocking the wing to change the angle of incidence thereof.

2. An aeroplane of the class described including a fuselage, a wing structure across the fuselage, means for pivotally mounting the wing structure on the fuselage, a pair of hollow members rising from the fuselage having slotted sides, links pivotally engaged with the forward edge of the wing and extending into the hollow members and having lateral pins projecting through the slots to limit the swinging movement of the wing, bars pivotally engaged with the wing and extending into the fuselage, and means threadedly engaged on the bars in the fuselage whereby said bars may be raised or lowered for changing the angle of incidence of the wings.

In testimony whereof I affix my signature.

WALFORD S. RODENE.